United States Patent
Perez

(10) Patent No.: US 9,610,544 B2
(45) Date of Patent: Apr. 4, 2017

(54) METHOD FOR CREATING A NANO-PERFORATED CRYSTALLINE LAYER

(71) Applicant: Israel Perez, San Diego, CA (US)

(72) Inventor: Israel Perez, San Diego, CA (US)

(73) Assignee: The United States of America as represented by Secretary of the Navy, Washington, DC (US)

(*) Notice: Subject to any disclaimer, the term of this patent is extended or adjusted under 35 U.S.C. 154(b) by 652 days.

(21) Appl. No.: 14/096,753

(22) Filed: Dec. 4, 2013

(65) Prior Publication Data

US 2015/0151254 A1    Jun. 4, 2015

(51) Int. Cl.
| | | |
|---|---|---|
| *B01D 67/00* | (2006.01) | |
| *B01D 71/02* | (2006.01) | |
| *B01D 61/02* | (2006.01) | |

(52) U.S. Cl.
CPC ..... *B01D 67/0062* (2013.01); *B01D 67/0072* (2013.01); *B01D 71/021* (2013.01); *B01D 61/025* (2013.01)

(58) Field of Classification Search
None
See application file for complete search history.

(56) References Cited

U.S. PATENT DOCUMENTS

| | | |
|---|---|---|
| 8,268,180 B2 | 9/2012 | Arnold et al. |
| 8,361,321 B2 | 1/2013 | Stetson et al. |
| 2011/0201201 A1 | 8/2011 | Arnold et al. |
| 2012/0048804 A1 | 3/2012 | Stetson et al. |
| 2013/0105417 A1* | 5/2013 | Stetson ............... C02F 1/442 210/806 |
| 2013/0143769 A1 | 6/2013 | Afzali-Ardakani et al. |
| 2013/0192460 A1 | 8/2013 | Miller et al. |
| 2014/0305864 A1* | 10/2014 | Sun ................. B01D 67/0093 210/505 |
| 2014/0311967 A1* | 10/2014 | Grossman ............ B32B 3/00 210/500.21 |
| 2016/0009049 A1* | 1/2016 | Stoltenberg ........... B32B 9/045 428/137 |

OTHER PUBLICATIONS

Stephan Blankenburg, "Porous Graphene as an Atomspheric Nanofilter", Small Journal, Oct. 18, 2010, p. 2266, vol. 6, No. 2, Wiley-VCH Verlag GmbH & Co. KGaA.
Xuekun Lu, "Patterning of Highly Oriented Pyrolytic Graphene by Oxygen Plasma Etching", Applied Physics Letters, Jul. 12, 1999, p. 193, vol. 75, No. 2, AIP Publishing, USA.

* cited by examiner

*Primary Examiner* — Krishnan S Menon
(74) *Attorney, Agent, or Firm* — SPAWAR Systems Center Pacific; Kyle Eppele; Susanna J. Torke

(57) ABSTRACT

The present invention is a method of controlling the perforation of crystalline grains in a layer of material. The first step of the method creates at least one crystalline layer composed of multiple grains and at least one grain boundary. Next, a material covers the grain boundaries to create a protective, reinforcing coating on the crystalline layer. Finally, an etching process creates perforations in the grains while the grain boundaries are protected from etching by the coating.

13 Claims, 3 Drawing Sheets

METHOD FOR CREATING A NANO-PERFORATED CRYSTALLINE LAYER

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 102084.

BACKGROUND

1. Field

This invention relates to the field of methods for etching a substrate, and more specifically to creating nanoscale perforations in a carbon substrate for reverse osmosis desalinization.

2. Background

Desalinization is the process of removing salt from water, generally to produce fresh water suitable for human consumption or irrigation. Sea-going vessels require large quantities of fresh water for crew hydration as well as cleaning, systemic and industrial uses. While some fresh water can be stored, water tanks are bulky, unstable and take up space that could be used for other applications. Desalinization of available seawater would provide an abundant source of fresh water, limited only by the amount of energy required for the desalinization process.

One method of desalinization known in the art is the use of reverse osmosis filters. Reverse osmosis filters known in the art are porous hydrophilic polymer membranes. The membranes are characterized by nanoscale channels with a diameter calculated to allow the flow of water molecules while preventing the passage of dissolved salt ions, separating fresh water from saltwater.

Reverse osmosis filters, known in the art, can be up to 1 mm thick. This thickness requires high energy levels (above 1.8 kWh/m$^3$) to force water molecules through for desalinization. This makes these polymer filters unsuitable for large-scale applications or in cases where a power supply may be limited, such as aboard a sea-going vessel.

Attempts have been made in the prior art to create thinner reverse osmosis filters. These attempts include utilizing a graphene layer with nanoscale perforations. Graphene is a term used to describe a layer of carbon that has the thickness of approximately one atom. Because a graphene layer is so thin, it requires considerably less energy for water flow than a polymer-constructed membrane.

However, is a recognized problem in the art that etching and masking techniques for constructing a filter structurally compromise the graphene layer and are difficult to control. Techniques which have been attempted in the prior art include electron/helium ion beam exposure, block copolymer masking, photolithography and chemical etching. Each of these methods has drawbacks.

Electron/helium ion beam exposure is slow and difficult to control. Block copolymer masking and photolithography utilize complex, rigidly predefined masking patterns which do not account for individual grain boundaries within the carbon layer and may result in structural instability. Block copolymer masking and photolithography also require that the mask be removed after creation of the perforation, requiring additional processing time and potentially damaging the filter. Chemical etching preferentially attacks carbon grain boundaries and defects, rendering the filter structurally unstable.

It is desirable to fabricate a carbon filter rapidly and controllably with perforations of a suitable scale, without inducing mechanical instability in the completed filter.

SUMMARY OF THE INVENTION

The present invention is a method and an apparatus formed by the method for controlling the perforation of crystalline grains in a layer of material. The first step of the method creates at least one crystalline layer composed of multiple grains and at least one grain boundary. A coating material then covers the grain boundaries to create a protective, reinforcing coating on the crystalline layer. An etching process subsequently creates perforations in the grains. The grain boundaries are protected from etching by the coating and the resulting apparatus maintains the structural integrity of the layer.

DETAILED DESCRIPTION OF INVENTION

Figure 1:
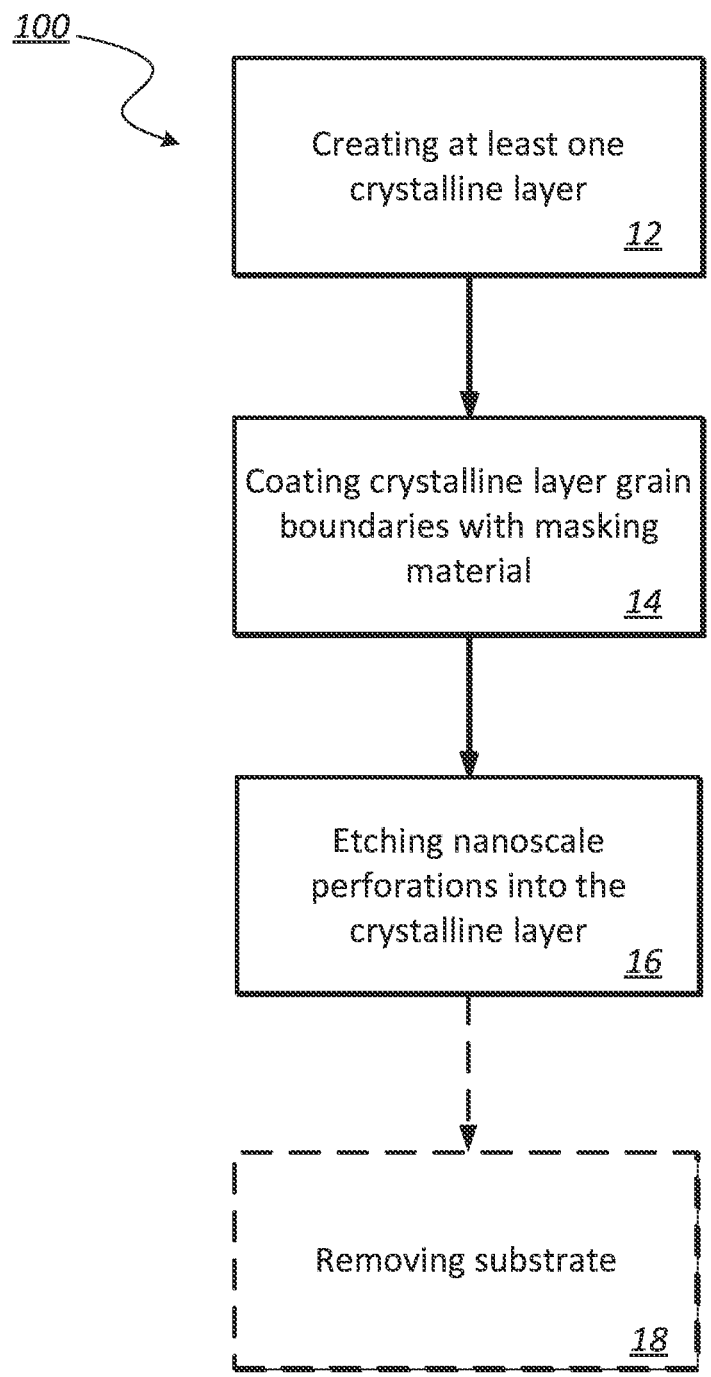
FIG. 1 shows a flowchart illustrating an exemplary method for creating a plurality of perforations in at least one crystalline layer.

FIG. 1 is a flowchart illustrating an exemplary method 100 for creating a plurality of perforations in at least one crystalline layer.

Step 12 is the step of creating at least one crystalline layer of a material having a plurality of grains. Step 14 is the step of coating at least one grain boundary of the at least one crystalline layer with masking material. Step 16 is the step of etching a plurality of perforations into the at least one crystalline layer. Step 18 is an optional step of removing the at least one crystalline layer from a substrate.

Step 12 is the step of creating at least one layer of a crystalline material having a plurality of grains and at least one grain boundary. In various exemplary embodiments, the crystalline layer may be a graphene layer deposited on a copper substrate through chemical vapor deposition. In other embodiments, the crystalline layer may be a plurality of graphite layers cut down from a larger block of graphite.

Step 14 is the step of coating one or more grain boundaries of the crystalline layer with masking material. In various embodiments the masking material preferentially attaches or is attracted by grain boundaries and grain defects. This results in a reinforcing mask over the grain boundary, which retains the structural integrity of the grain boundary. The amount of masking material deposited during Step 14 determines the portion of the grain that is available for etching in the next step. This provides control of the diameters of the perforations. Furthermore, unless grain defects are close to the grain boundary, the grain defects will detach and become lost during etching, ensuring that the plurality of perforations will have appropriate diameters.

In various embodiments, the masking material is deposited using methods including, but not limited to, electrodeposition, chemical vapor deposition, atomic layer deposition and sol-gel.

In an embodiment utilizing electrodeposition, applying a voltage bias between the crystalline layer and a counter electrode in solution electrochemically deposits a metal or metal oxide masking material. In the initial stages of deposition, growth kinetics are governed by nucleation seeds ("nucleates") that occur on the surface of the crystalline layer. At lower over potentials, these nucleates preferentially occur at grain defects in the crystalline layer. Since the majority of defects in the crystalline layer occur at grain boundaries, nucleates will occur there in higher density than on the plurality of grains. As the electrodeposition proceeds, hemispherical diffusional transport dominates around each nucleate, drawing more and more material toward the grain boundary of the crystalline layer. As the hemispherical deposits merge, hemicylindrical wires start to form, outlining the grain boundary of the crystalline layer. This electrodeposited masking material then acts as a reinforcing mask to pattern the underlying crystalline layer.

In alternative embodiments using chemical vapor deposition or atomic layer deposition, two or more different chemical precursors, exposed to the crystalline layer, deposit a gas-phase masking material. In the initial stages of deposition, chemisorption or rapid reaction of the precursor molecules occurs preferentially at defects in the crystalline layer. The pristine parts of the plurality of grains in the crystalline layer are left clean since there are no surface groups available to react with. As the deposition proceeds, hemispherical and/or hemicylindrical growth profiles emanate from the grain boundary, outlining the grain boundary of the crystalline layer. This deposited masking material then acts as a reinforcing mask to pattern the underlying crystalline layer.

In an embodiment using sol-gel, two or more different chemical precursors, exposed to the crystalline layer, deposit a wet-phase masking material. In the initial stages of deposition, chemical reactions of the precursor molecules occur preferentially at defects in the crystalline layer. The pristine parts of the plurality of grains in the crystalline layer are left clean since there are no surface groups available to react with. As the deposition proceeds, hemispherical and/or hemicylindrical growth profiles emanate from the grain boundary, outlining the grain boundary of the crystalline layer. This deposited masking material then acts as a reinforcing mask to pattern the underlying crystalline layer.

At Step 16, a plurality of nanoscale perforations in the crystalline layer are created. An etching process performed on the crystalline layer creates the plurality of nanoscale perforations. The reinforcing mask over the grain boundary provides protection, leading to etching the plurality of nanoscale perforations only within the plurality of grains and not on the grain boundaries. This maintains the structural stability of the crystalline layer during the etching process and after completion.

In various alternative embodiments, the crystalline layer may be etched using methods including, but not limited to, reactive-ion etching, wet etching with an acid, wet etching with a base, electrochemical etching with an acid and electrochemical etching with a base.

In one embodiment, reactive-ion etching is used to bombard exposed atoms of the crystalline layer with hydrogen or oxygen plasma. The energetic ions of the plasma break exposed portions of the crystalline layer down into smaller molecules with high vapor pressures. These smaller molecules can easily be removed from the environment surrounding the crystalline layer. The reactive-ion etching is directional, preventing etching underneath the previously deposited reinforcing mask.

In an alternative embodiment using wet-chemical etching, strongly acidic or basic chemicals react with exposed atoms of the crystalline layer in oxidation or reduction reactions, respectively. This creates lower molecular weight waste products which diffuse away in solution. This process can be assisted in electrochemical etching by applying a voltage potential to solution, driving the exposed atoms of the crystalline layer to oxidize or reduce in solution.

In various embodiments, at Step 18 the crystalline layer may be removed from a substrate. In this exemplary embodiment, the crystalline layer is a single layer of graphene deposited on a copper substrate. This copper substrate is not etched in Step 16. In order to utilize the single layer of graphene as a freestanding filter, it must be removed from the copper substrate to permit molecules to pass through the plurality of nanoscale perforations.

Figure 2A:
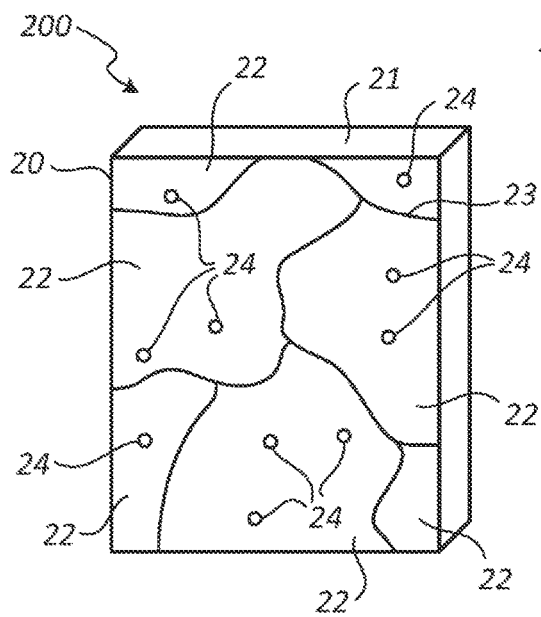
FIGS. 2a through 2c illustrate top views of an exemplary embodiment of a graphene layer apparatus.

FIG. 2a illustrates a top view of an exemplary embodiment of a graphene layer apparatus 200 after Step 12, showing a graphene layer 20 on a copper substrate 21 with a plurality of grains 22 having at least one grain boundary 23 and grain defects 24. The plurality of grains 22 may be fabricated with a size ranging from about 10 nm to about 10 mm.

Figure 2B:
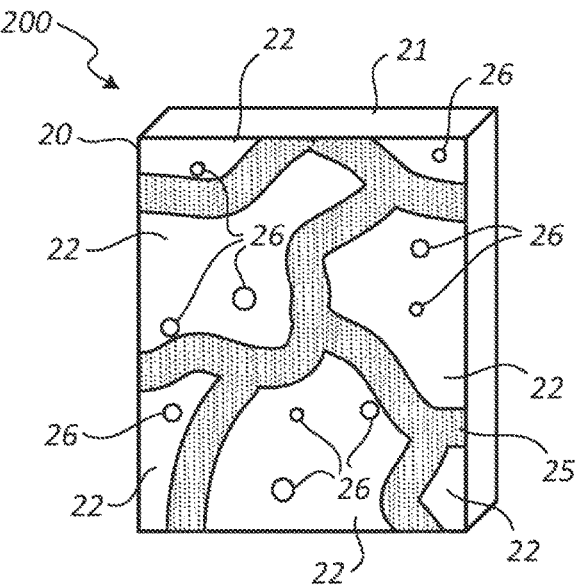

FIG. 2b illustrates a top view of an exemplary embodiment of a graphene layer apparatus 200 after Step 14, showing the graphene layer 20 on copper substrate 21 with the at least one grain boundary 23 (not shown) covered by at least one reinforcing mask 25 made of a masking material. The grain defects 24 (not shown) are also covered by a grain defect mask 26 made of masking material. The masking material may be, but is not limited to, metal, metal oxide, or polymer materials.

Figure 2C:
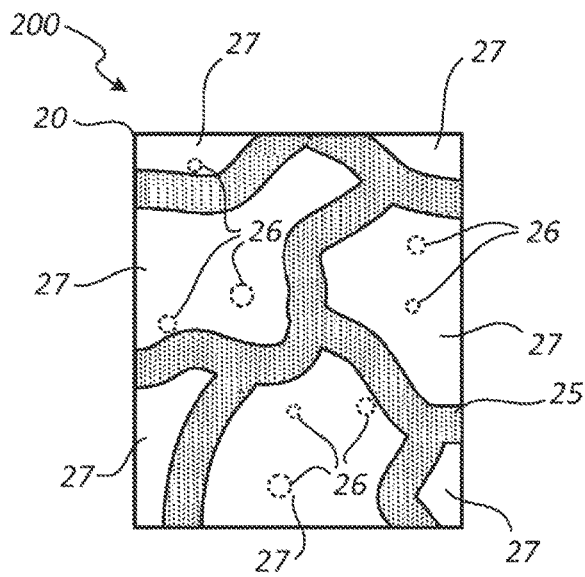

FIG. 2c illustrates a top view of an exemplary embodiment of a graphene layer apparatus 200 after Steps 16 and 18, showing the graphene layer 20 with at least one grain boundary 23 (not shown) covered by at least one reinforcing mask 25 and a plurality of nanoscale perforations 27 distributed throughout the plurality of grains 22 (not shown). The plurality of nanoscale perforations 27 range from about 1 nm to about 1 mm in diameter.

The exemplary embodiment of FIG. 2c may be used as a freestanding reverse osmosis filter in desalinization systems. It may also be utilized as a filter in other applications.

Figure 3:
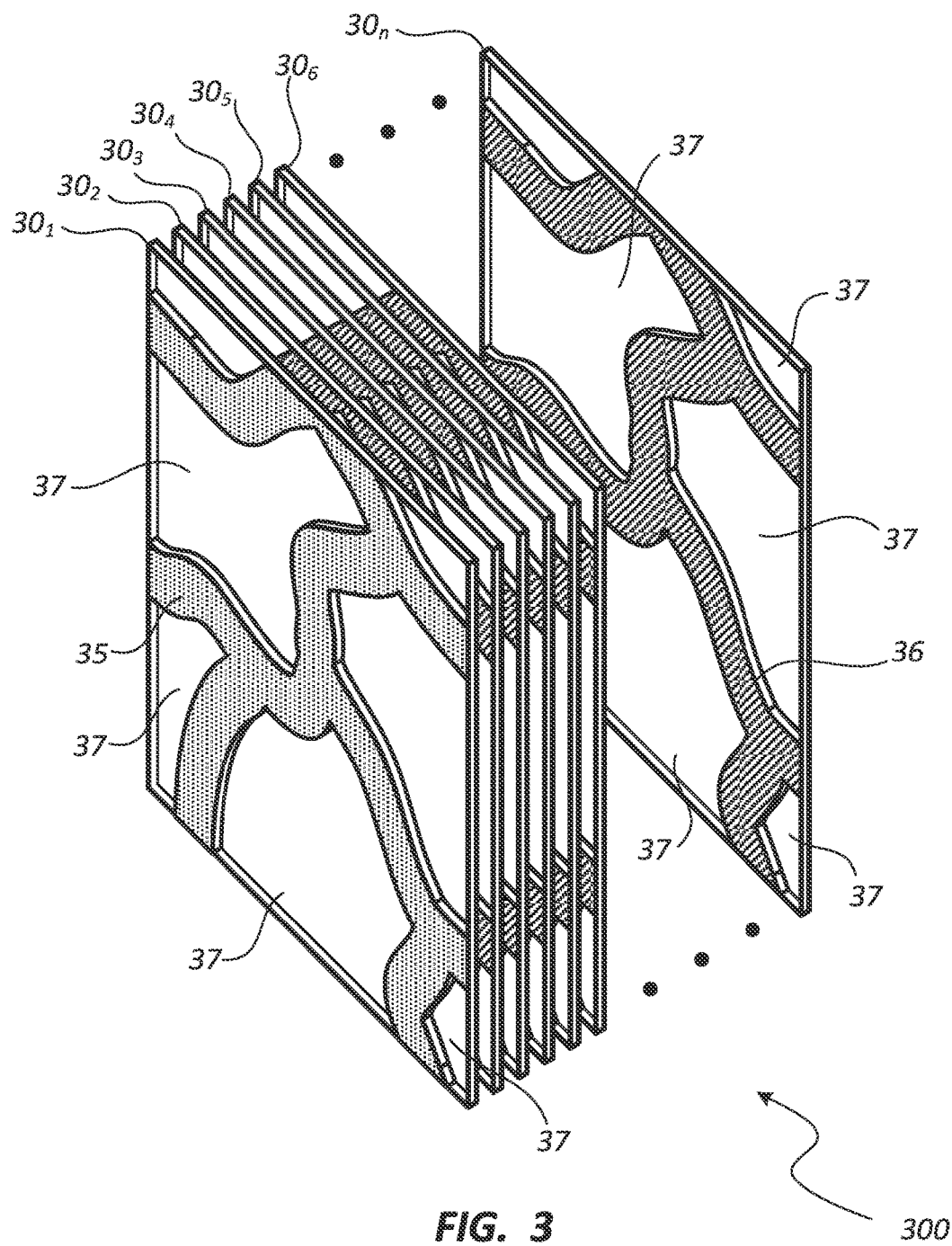
FIG. 3 illustrates an exploded view of an exemplary embodiment of an apparatus formed from a plurality of graphite layers.

FIG. 3 illustrates an exploded view of an exemplary embodiment of an apparatus 300 formed from a plurality of graphite layers, showing a first graphite layer $30_1$ with at least one grain boundary 33 (not shown) covered by at least one reinforcing mask 35 and a plurality of nanoscale perforations 37 distributed throughout the plurality of grains 32 (not shown), as well as a plurality of graphite layers $30_n$ with a plurality of nanoscale perforations 37 distributed throughout the plurality of grains 32.

In the exemplary embodiment of FIG. 3, the size of the plurality of grains 32 may range from about 10 nm to about 10 mm. The plurality of nanoscale perforations 37 of the plurality of graphite layers $30_n$ align with the plurality of nanoscale perforations 37 of the first graphite layer $30_1$. The plurality of nanoscale perforations 37 range from about 1 nm to about 1 mm in diameter. Each of the plurality of graphite layers $30_n$ also has unetched portions 36 located beneath and aligned with the at least one reinforcing mask 35 of the first graphite layer $30_1$.

While the exemplary embodiment of FIG. 3 may be used as a filter, other embodiments may be used as carbon capacitors in an electrode.

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. A method of controlling the perforation of crystalline material during etching comprising the steps of:
   creating at least one crystalline layer, wherein said at least one crystalline layer comprises any one of a graphene layer deposited on a copper substrate through chemical vapor deposition and a plurality of graphite layers cut down from a larger block of graphite;
   wherein said at least one crystalline layer has a plurality of grains, wherein each of said plurality of grains has at least one grain boundary;
   coating said at least one grain boundary with a masking material to create a reinforcing mask on said at least one grain boundary, wherein said reinforcing mask reinforces said at least one crystalline layer;
   etching a plurality of perforations into said plurality of grains, and
   wherein said plurality of grains range in size from about 10 nm to about $1 \times 10^7$ nm.

2. The method of claim 1, wherein said step of creating at least one crystalline layer further comprises creating at least one carbon layer by chemical vapor deposition of a plurality of carbon atoms onto a copper substrate, wherein said plurality of grains range in size from about 10 nm to about 10 mm.

3. The method of claim 1, wherein said step of creating at least one crystalline layer further comprises creating a plurality of carbon layers by cutting down a block of graphite, wherein said plurality of grains range in size from about 10 nm to about 10 mm.

4. The method of claim 1, wherein said step of coating said at least one grain boundaries utilizes a method selected from the group consisting of electrodeposition, chemical vapor deposition, atomic layer deposition and sol-gel.

5. The method of claim 1, wherein said step of etching a plurality of perforations utilizes a method selected from the group consisting of reactive-ion etching, wet etching with an acid, wet etching with a base, electrochemical etching with an acid and electrochemical etching with a base.

6. The method of claim 1, wherein said step of reactive-ion etching utilizes a method selected from the group consisting of hydrogen plasma etching and oxygen plasma etching.

7. The method of claim 1, wherein said step of etching a plurality of perforations further includes etching a plurality of perforations ranging from about 1 nm to about $1 \times 10^6$ nm in diameter.

8. A method of making a perforated carbon layer comprising the steps of:
   creating at least one carbon layer, wherein said at least one carbon layer has a plurality of grains, wherein each of said plurality of grains has at least one grain boundary;
   coating said at least one grain boundary with a masking material to create a reinforcing mask; and
   etching a plurality of perforations into said plurality of grains, wherein said plurality of perforations range from about 1 nm to about $1 \times 10^6$ nm in diameter.

9. The method of claim 8, wherein said step of creating at least one carbon layer further comprises creating said at least one carbon layer by chemical vapor deposition of carbon atoms onto a copper substrate, wherein said plurality of grains range in size from about 10 nm to about $1 \times 10^7$ nm.

10. The method of claim 8, wherein said step of creating at least one carbon layer further comprises creating a plurality of carbon layers by cutting down a block of graphite wherein said plurality of grains range in size from about 10 nm to about $1 \times 10^7$ nm.

11. The method of claim 8, wherein said step of coating said grain boundaries utilizes a method selected from the group consisting of electrodeposition, chemical vapor deposition, atomic layer deposition and sol-gel.

12. The method of claim 8, wherein said step of etching a plurality of perforations utilizes a method selected from the group consisting of reactive-ion etching, wet etching with an acid, wet etching with a base, electrochemical etching with an acid and electrochemical etching with a base.

13. The method of claim 12, wherein said step of reactive-ion etching utilizes a method selected from the group consisting of hydrogen plasma etching and oxygen plasma etching.

* * * * *